US005307736A

United States Patent [19]
Sorensen

[11] Patent Number: 5,307,736
[45] Date of Patent: May 3, 1994

[54] FOOD COOKING

[76] Inventor: Richard H. Sorensen, c/o Fry Factory Corporation, 900 E. John St., Ste. B, Banning, Calif. 92220

[21] Appl. No.: 977,135

[22] Filed: Nov. 16, 1992

[51] Int. Cl.$^5$ .............................. A47J 37/12
[52] U.S. Cl. ...................... 99/330; 99/353; 99/355; 99/357; 99/407
[58] Field of Search .......... 99/330, 335, 353, 355–357, 99/403–408, 443 C, 483, 430, 536; 426/231, 429, 14 431, 441, 509, 512, 513, 518, 516, 438; 222/372; 221/150 A, 150 R, 150 HC

[56] References Cited

U.S. PATENT DOCUMENTS

| | | | |
|---|---|---|---|
| 3,124,122 | 3/1964 | Baron | 99/406 |
| 3,280,723 | 10/1966 | Hughes et al. | 99/353 |
| 3,448,677 | 6/1969 | Dexters | 99/336 |
| 3,645,196 | 2/1972 | Johnston et al. | 99/404 |
| 3,685,432 | 8/1972 | Hoeberigs | 99/357 |
| 3,771,937 | 11/1973 | Harmon et al. | 425/161 |
| 3,885,056 | 5/1975 | Smith et al. | 426/441 |
| 3,997,684 | 12/1976 | Willard | 426/550 |
| 4,096,791 | 6/1978 | Weiss et al. | 99/353 |
| 4,252,252 | 2/1981 | Gross et al. | 222/372 |
| 4,359,935 | 11/1982 | Murray | 99/331 |
| 4,438,683 | 3/1984 | Bartfield | 99/330 |
| 4,540,588 | 9/1985 | Bartfield | 99/330 |
| 4,646,627 | 4/1985 | Bartfield et al. | 99/330 |

Primary Examiner—Timothy F. Simone
Attorney, Agent, or Firm—Fish & Richardson

[57] ABSTRACT

An apparatus for preparing, cooking, and dispensing a food product. A rehydration chamber in the apparatus combines a quantity of dehydrated food product and a quantity of heated rehydration liquid to produce a quantity of rehydrated food product that is sufficient to produce an individual portion of cooked food product. A compression station compresses the rehydrated food product to create a prepared mixture of homogenous consistency. An extrusion station extrudes the prepared mixture into a cooker containing a cooking medium. The cooker cooks the extruded prepared mixture to produce an individual portion of cooked food product which is then dispensed by a dispenser. The rehydration chamber, the compression station, the extrusion station, and the cooker are arranged so that the rehydration chamber can process a first individual portion of cooked food product while the compression station is simultaneously processing at least a second individual portion of cooked food product, the extrusion station is simultaneously processing at least a third individual portion of cooked food product, and the cooker is simultaneously processing at least a fourth individual portion of cooked food product.

38 Claims, 4 Drawing Sheets

FOOD COOKING

The present invention relates in general to fried food preparation and more particularly concerns novel apparatus and techniques for preparing, cooking, and dispensing a fried food product prepared from a novel dehydrated potato formulation that is rehydrated immediately prior to forming, cooking, and dispensing.

BACKGROUND OF THE INVENTION

For background, reference is made to U.S. Pat. Nos. 4,646,627, 4,540,588, and 4,438,683, each disclosing an apparatus for preparing and dispensing fried potato products.

SUMMARY OF THE INVENTION

According to the invention, there is a mechanism for combining a quantity of dehydrated food product and a quantity of heated rehydration liquid to create a quantity of rehydrated food product that is sufficient to produce an individual portion of cooked food product using a process that causes the product to become completely rehydrated without mechanical agitation, a mechanism for compressing the rehydrated food product to create a mixture of homogenous consistency, a mechanism for extruding the homogeneous mixture into a cooking medium, and a mechanism that dispenses the cooked food product. These mechanisms are arranged in a way that allows simultaneous and separate processing of a plurality of individual orders of the fried food product.

The apparatus may also include a supply hopper capable of holding an amount of dehydrated food product that is sufficient for preparation of hundreds of individual portions of the fried food product. This supply hopper can be equipped with sensors for detecting when the amount of dehydrated food product contained therein is becoming low or when this amount has become too low to allow processing of additional portions. These sensors may comprise light sources directed at light detectors so that when there is a sufficient amount of dehydrated food product in the hopper, the dehydrated food product will prevent light from the light source from shining on the light detector.

A metering device may be provided to maintain precise control over the quantity of dehydrated food product used in each portion and to ensure that a consistent predetermined amount of dehydrated food product is used in each portion. This metering device may comprise a multi-chambered paddle wheel.

The rehydration device may include a rehydrator having a manifold with a central hole and a plurality of spray nozzles. These spray nozzles may be directed to spray in an interferometer pattern at a stream of dehydrated food product that falls through the central hole of the rehydrator.

To ensure that all of the dehydrated food product is properly rehydrated, the spray of rehydration liquid preferably starts before the stream of dehydrated food product and ends after cessation of the stream.

A director may also be provided to direct the stream of dehydrated food product from the metering device to the central hole of the rehydrator.

The apparatus may further include a rehydration liquid supply system for supplying rehydration liquid to the rehydrator. The rehydration liquid supply system may include a sediment filter for removing sediment from the rehydration liquid, a deionizing filter for deionizing the rehydration liquid to remove dissolved chemicals and minerals, a reservoir for storing the rehydration liquid, a heater for heating the rehydration liquid, and a pump that supplies a precise predetermined quantity of rehydration liquid to the rehydrator for rehydration of each individual portion of dehydrated food product.

The apparatus can include a transport for transporting the food product from the rehydration chamber to the compression chamber, and for transporting the food product from the compression chamber to the extrusion chamber, such as a carousel.

The extrusion chamber may include an extrusion grate located at the extrusion station, and an extrusion ram, located above the extrusion grate, that moves downward and forces the food product through the extrusion grate. Generally, the extrusion chamber may be located over a vessel containing the cooking medium so that when the extrusion ram moves to contact the extrusion grate, this contact causes the food product to fall into the cooking medium. The extrusion chamber and cooking vessel may be arranged so that, when the food product falls into the cooking medium, the food product is already partially submerged in the cooking medium. This arrangement prevents splashing and also prevents the separate pieces of food product from sticking together.

The cooking vessel may contain a plurality of cooking baskets, each sufficiently sized to hold an individual portion of food-product. These cooking baskets may be attached, via a coupling mechanism, to a rotating shaft located in the center of the cooking vessel.

The temperature of the cooking medium may be controlled and maintained by three heater bands, each thermostatically connected to a temperature sensor that is connected to the cooking vessel. A heater band is turned on or off depending on whether the temperature of the cooking vessel sensed by its associated temperature sensor is less than or greater than a predetermined desired cooking vessel temperature.

The temperature of the cooking medium may be further controlled by an additional temperature sensor located within the cooking medium. This temperature sensor turns off all of the heater bands when it senses that the temperature of the cooking medium is in excess of a predetermined desired cooking medium temperature. This second predetermined temperature is less than the first predetermined temperature used to individually control the heater bands.

An air distribution system may also be provided. This system may include a high pressure blower that draws air through an inlet located at the bottom of the apparatus. The air flows around a power supply and across an electronic control system to cool those devices before flowing around the cooking vessel to remove heat and vapors. Next, the air flows through an oil coalescing filter and an odor filter before finally passing through the blower and out an exhaust vent.

In some embodiments, the apparatus also includes a cooking medium filtering system. This system is used when the device is not in operation. When the filtering system is activated, the cooking medium is drained through a drain hole and into a drain tube. Via a first valve, the cooking medium flows from the drain tube into a filtering chamber. In the filtering chamber, the cooking medium flows from a first subchamber, through a filter, to a second subchamber. From the second subchamber, the cooking medium is pumped, via a second valve, the drain tube, and the drain hole, back into the cooking vessel.

The apparatus may also provide storage and a dispenser for delivery receptacles, storing and dispensing condiments, and replacement of cooking medium that is consumed within the process. The apparatus may also include safety devices such as over-temperature shutdown, inadequate air flow sensors, and an automatic fire extinguisher system.

Another aspect of the invention is a novel, all natural, dehydrated potato product that comprises a mixture of dehydrated potato granules, both large and small cell pregelatinized potato starch, xantham gum, guar gum, natural flavor, and cellulose. This dehydrated potato product is combined with water in a predetermined ratio to produce a rehydrated potato mixture of consistent characteristics.

According to the invention, a metered stream of dehydrated potato product is directed through a metered spray of deionized, heated water to rehydrate each individual granule of the dehydrated potato product. The resulting potato dough is compressed to exude voids and to form a solid high density block having substantially constant consistency. This block of dough is formed, by extrusion, into a predetermined number of uncooked potato sticks that are deposited directly into a cooking vessel containing a heated cooking medium maintained at a predetermined temperature. The apparatus typically includes two carousels, each with four stations, one carousel including rehydration, compression, and extrusion stations, while the other has four cooking stations. This arrangement allows for serial, simultaneous preparation of multiple individual orders (i.e., at the same time that one order is being rehydrated, another order can be being compressed).

Other features, objects, and advantages of the invention will become apparent from the following detailed description when read in connection with the accompanying drawings in which:

DETAILED DESCRIPTION

Figures 1, 1A:
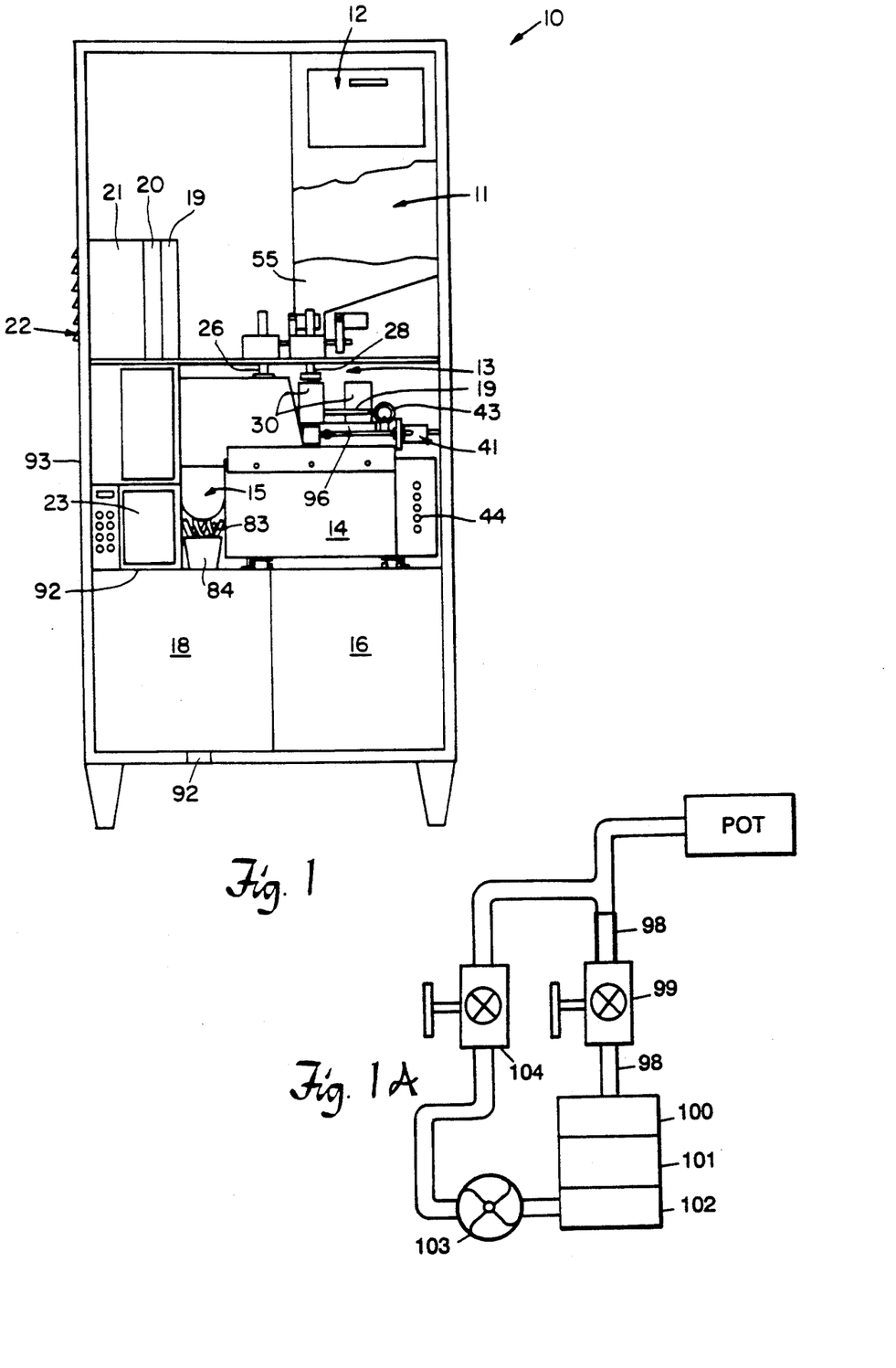
FIG. 1 is a front view or an exemplary embodiment of the invention.
FIG. 1A is a front view of the oil filter system within block 16 of FIG. 1.

With reference now to the drawings and more particularly to FIG. 1, there is shown a front view of a fried potato preparation, cooking, and dispensing apparatus 10. The apparatus 10 comprises a product hopper 11, a product fill door 12, a preparation area 13, a cooking enclosure 14, a dispenser chute 15, an oil filter system 16, a water filtering and metering system 17 (shown in FIG. 4), a water storage area 18, an oil coalescing filter 19, an odor filter 20, a high pressure blower 21, an exhaust vent 22, and a control system 23.

Figure 2:
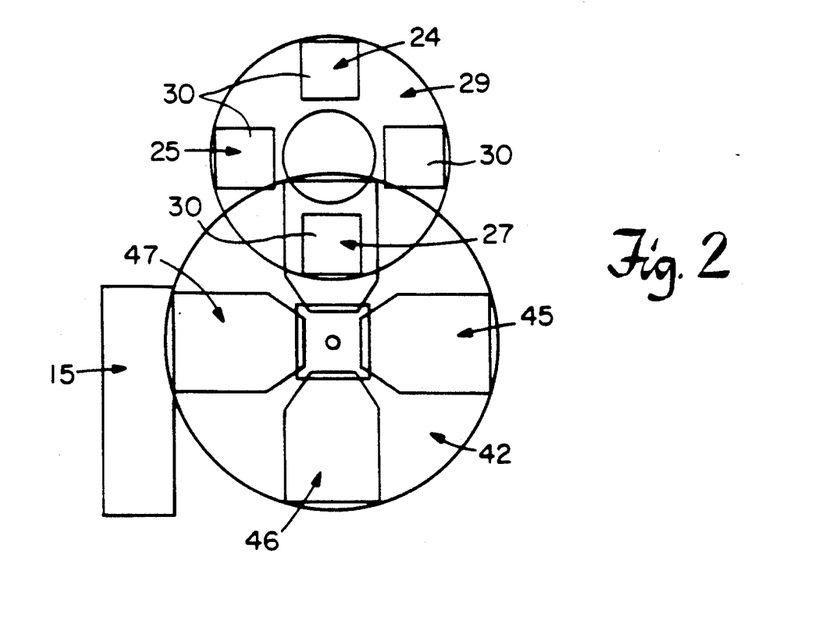
FIG. 2 is a top view of an exemplary embodiment of the carousel arrangement used in the invention.

Referring to FIG. 1 and FIG. 2, preparation area 13 includes a rehydration station 24, a compression station 25 having a compression ram 26, an extrusion station 27 having an extruder ram 28, a preparation carousel 29, and four extrusion cups 30.

Figure 3:
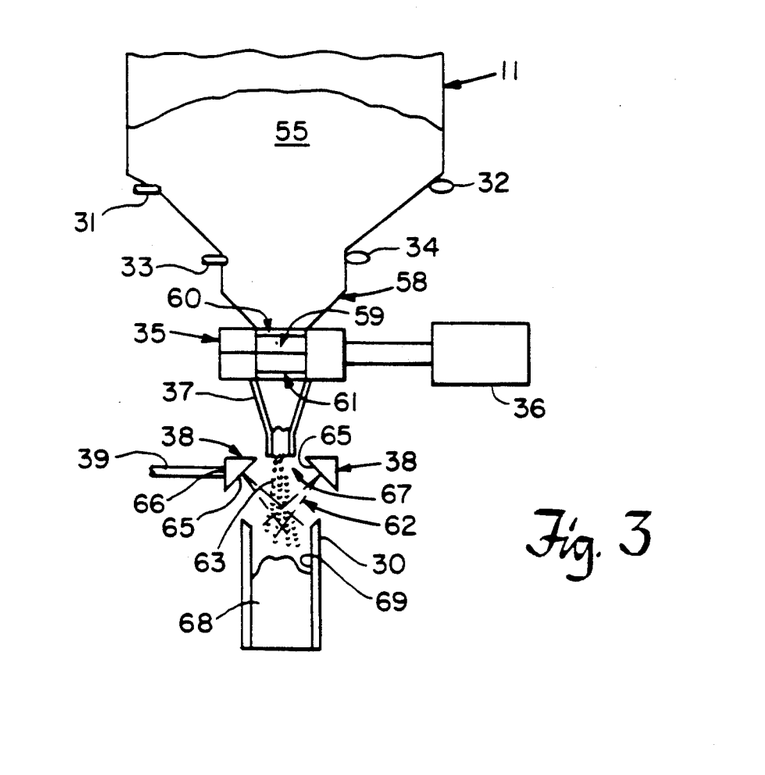
FIG. 3 is a side view of an exemplary embodiment of the food metering and rehydrating device used in the invention.

Referring to FIG. 3, rehydration station 24 includes product hopper 11, low level sensor 31, low level light source 32, empty sensor 33, empty light source 34, meter 35, meter driving motor 36, director 37, rehydrator 38, water supply tube 39, and extrusion cup 30.

Referring to FIG. 1 and FIG. 2, cooking enclosure 14 includes cooking baskets 27', 45', 46' and 47', cooking basket drive system 41, cooking carousel 42, fire extinguisher 43, and heater status lights 44. Cooking carousel 42 moves cooking baskets 27', 45', 46' and 47' among four stations: extrusion station 27, cooking station 45, cooking station 46, and dump station 47.

Figure 4:
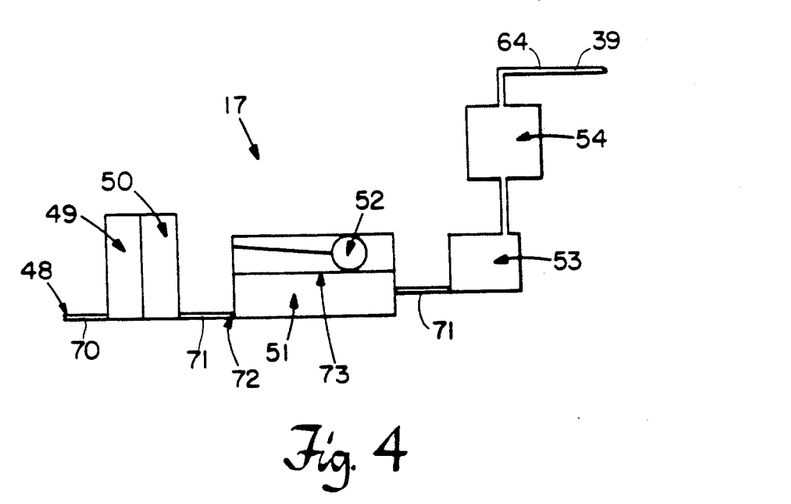
FIG. 4 is a side view of an exemplary embodiment of the water filtering and metering device used in the invention.

Referring to FIG. 4, water filtering and metering system 17 includes water inlet 48, sediment filter 49, deionizing filter 50, water reservoir 51, water level sensor 52, rehydrating pump 53, water heater 54, and water supply tube 39.

Having described the physical arrangement of the apparatus, its mode of operation will be described.

The preparation process refers to the process of converting a predetermined amount of dehydrated potato product 55 into a predetermined number of uncooked potato sticks 56 (not shown). The preparation process includes the metering process, the rehydration process, the compression process, and the extrusion process. Each of these processes are described in detail below.

The metering process occurs at rehydration station 24 and is carried out primarily by meter 35. The meter 35 obtains an exact amount of dehydrated potato product 55 from product hopper 11 and delivers the dehydrated potato product 55, via director 37, to rehydrator 38.

Figure 6:
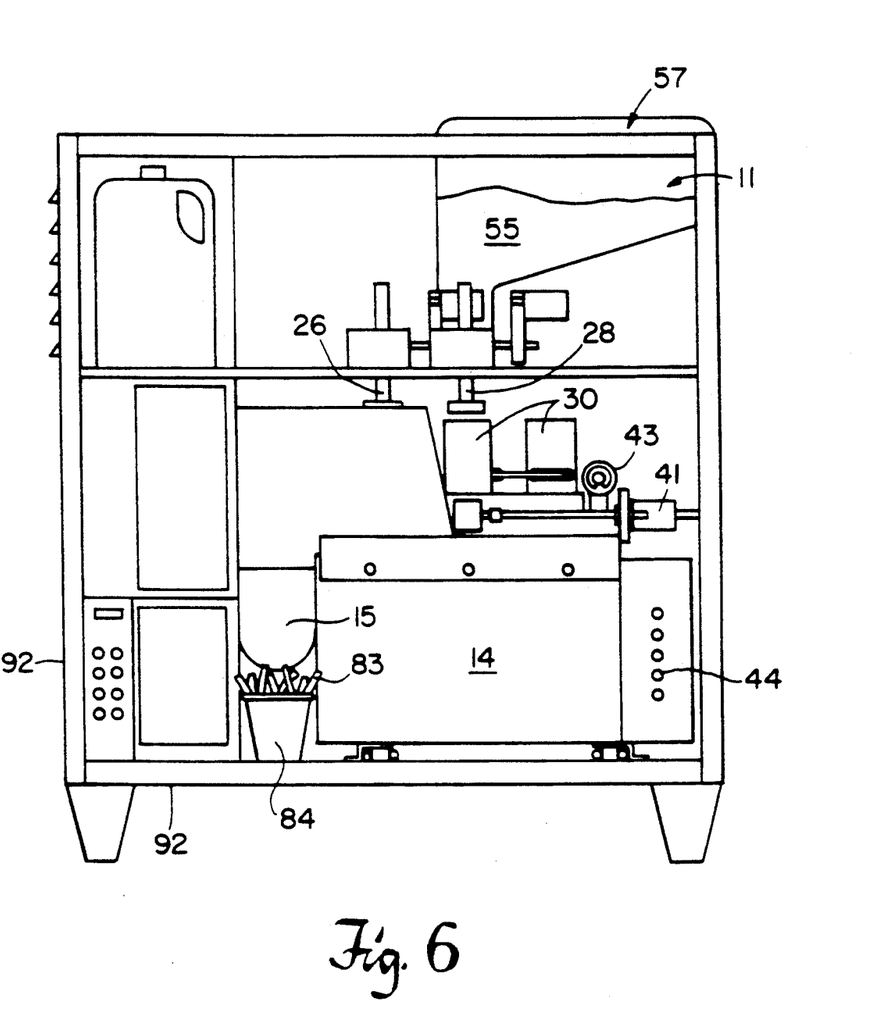
FIG. 6 is a front view of an additional exemplary embodiment of the invention.

In the embodiment shown in FIG. 1, product hopper 11 is filled through product fill door 12 and has a maximum storage capacity in excess of 400 individual orders. In the embodiment shown in FIG. 6, product hopper 11 is filled through product fill hatch 57 and has a maximum storage capacity in excess of 100 individual orders.

To ensure that there is sufficient dehydrated potato product 55 to begin the preparation process, empty sensor 33 and empty light source 34 are provided. When the level of dehydrated potato product 55 in product hopper 11 is too low to prepare additional orders, light emitted by empty light source 34 is able to shine on empty sensor 33. Empty sensor 33 then signals control system 23 of this condition and prevents further order preparation. Meanwhile, when there is a sufficient level of dehydrated potato product 55 to begin the preparation process, the dehydrated food product prevents the light emitted by empty light source 34 from shining on empty sensor 33.

Low level sensor 31 and low level light source 32 operate in a manner similar to that of empty sensor 33 and empty light source 34 and provide warning when the level of dehydrated potato product 55 is becoming low. Generally, low level sensor 31 is arranged to provide warning when the level of dehydrated potato product 55 in product hopper 11 falls below 20% of the storage capacity of product hopper 11.

Meter 35 is attached to a neck 58 formed at the bottom of product hopper 11. Meter 35 includes an auger or a six-chamber motor-driven paddle wheel 59 that dispenses an exact measure of dehydrated potato product 55 each time the paddle wheel or auger 59 is rotated a predetermined number of degrees. The inlet side 60 of meter 35 is arranged so that a section of the auger or two chambers of paddle wheel 59 freely load from product hopper 11 and the outlet side 61 of meter 35 delivers dehydrated potato product 55 into director 37 at a continuous rate. Metering of dehydrated potato product 55 is initiated at the same time that rehydrating pump 53 is started so that rehydration spray 62 starts slightly ahead of the flow of dehydrated potato product 55 into rehydrator 38.

Director 37 is attached to the outlet side 61 of meter 35. Director 37 is essentially a funnel and its function is to collect and direct dehydrated potato product 55, as a coherent product stream 63, into the rehydrator 38.

The rehydration process occurs at rehydration station 24 and is carried out primarily by rehydrator 38. Water filtering and metering system 17 supplies, via water supply tube 39, an exact amount of filtered, deionized, and heated water 64 to rehydrator 38.

Rehydrator 38 is an octagonal manifold that has four or eight spray nozzles 65, a water inlet 66, and a central hole 67. Rehydrator 38 is positioned so that the dehydrated potato product 55 falls through central hole 67 in a product stream 63, and spray nozzles 65 direct the rehydration spray 62 in an interferometer pattern at the center of product stream 63. Product stream 63 and rehydration spray 62 combine to form rehydrated potato product 68 which thereafter falls into extrusion cup 30.

Rehydration spray 62 starts before product stream 63 arrives at rehydrator 38, and thereby wets the interior walls 69 of extrusion cup 30. Also, rehydration spray 62 ends after product stream 63 ends so as to wash stray particles off the interior walls 69 of extrusion cup 30.

Regardless of particle size, each granule of dehydrated potato product 55 is rehydrated in flight, thereby achieving total rehydration in a relatively short time.

Because the public utility water 70 supplied for use in the rehydration process through inlet 48 normally contains sediment, chemicals, and dissolved minerals, all of which are deleterious to the quality of the finished potato product, water 70 passes through sediment filter 49 to remove sediment. The filtered water is then deionized by deionizing filter 50 to remove most dissolved chemicals and minerals.

The filtered, deionized water 71 is held in water reservoir 51. This reservoir is fitted with a water level sensor 52 that controls a solenoid valve 72 so that the water level 73 is automatically maintained.

In operation, rehydration pump 53 draws filtered, deionized water 71 from reservoir 51 and pumps it into the bottom of water heater 54. Water 71 displaces heated water 64 already in water heater 54 and causes heated water 64 to flow through water supply tube 39 into rehydrator 38. The heated water 64 arrives at rehydrator 38 slightly prior to the arrival of potato stream 63 and continues to be sprayed at potato stream 63 and into the extrusion cup 30, for about 3.85 seconds. Because potato stream 63 flows for about 3.75 seconds, rehydration spray 62 terminates about 0.1 seconds after termination of potato stream 63.

Upon completion of the rehydration process, preparation carousel 29 conveys extrusion cup 30 containing rehydrated potato product 68 to compression station 25. At the same time, preparation carousel 29 conveys an empty extrusion cup 30 to rehydration station 24.

Extrusion cups 30 are four-sided, bottomless cups. In operation, extrusion cups 30 slide along a flat, fixed, surface 96. Extrusion cups 30 and surface 96 are teflon coated. Moreover, surface 96 is heated to prevent the accumulation of moisture on surface 96. Because extrusion cups 30 are in contact with surface 96, heat is transferred by conduction to extrusion cups 30, and this heat prevents accumulation of moisture on extrusion cups 30. Likewise, when the apparatus is not in operation, compression ram 26 and extrusion ram 28 are placed in contact with surface 96 to transfer heat by conduction to compression ram 26 and extrusion ram 28 and thereby prevent the accumulation of moisture thereon.

At compression station 25, compression ram 26 moves downward to a down position and exerts pressure on rehydrated potato product 68. Compression ram 26 remains in the down position for about three seconds. The pressure applied by compression ram 26 compresses rehydrated potato product 68, which, immediately subsequent to rehydration, was in a loose pile, into a compressed block 73 (not shown) of standard size and homogeneous consistency. Time spent at compression station 25 serves the additional purpose of allowing the recently rehydrated potato product to "set up" before it moves to extrusion station 27.

Upon completion of the compression process, extrusion cup 30 containing compressed block 73 is conveyed to extrusion station 27 via preparation carousel 29. At the same time, an extrusion cup 30 containing recently rehydrated potato product 68 is conveyed to compression station 25.

At extrusion station 27, extrusion cup 30 is placed over extrusion grate 74 (not shown) which is built into surface 96. Located above extrusion station 27 is extrusion ram 28. Extrusion ram 28 has a grooved head 75 (not shown) that mates with extrusion grate 74. In operation, extrusion ram 28 moves rapidly downward until the grooved head 75 is firmly seated within extrusion grate 74. When the extrusion ram 28 arrives at this seated position, thirty six 3.31×0.275×0.275 inch uncooked potato sticks 76 (not shown) part from the extrusion ram 28 by gravity, and fall into a waiting cooking basket 27'. At the moment of parting, approximately one-half inch of each uncooked potato stick 76 is submerged in cooking oil 77. This reduces splashing and prevents the uncooked potato sticks 76 from sticking together.

There are four cooking baskets 27', 45', 46' and 47' attached, via a coupling mechanism, to a shaft 78 that rotates in a bearing hole 79 (shown in FIG. 5) that is drilled through the center post 80 of cooking vessel 81 contained in cooking enclosure 14. Cooking baskets 27', 45', 46' and 47' are made from stainless steel having a plurality of holes so as to allow free flow of cooking oil between cooking baskets 27', 45', 46' and 47' and the interior of cooking vessel 81.

Shaft 78 is driven by a cooking basket drive system 41 that causes the cooking baskets 27', 45', 46' and 47' to, alternately, rotate for 7.5 seconds (rotating 90°) and rest for 7.5 seconds. This arrangement provides a cooking time of approximately 50 seconds per order. The four basket arrangement also allows orders to be processed sequentially, and, thereof ore, allows processing of up to four orders per minute.

When a cooking basket containing an order of cooked potato product 83 arrives at dump station 47, the cooking basket is raised to a point that is just above the surface level of cooking oil 77. The cooking basket then pauses for three seconds to allow excess cooking oil 77 to drain. Thereafter, the cooking basket is quickly raised far enough to eject the cooked potato product 83 from the cooking basket into delivery chute 15. Delivery chute 15 directs the cooked potato product 83 into a receptacle 84.

Figure 5:
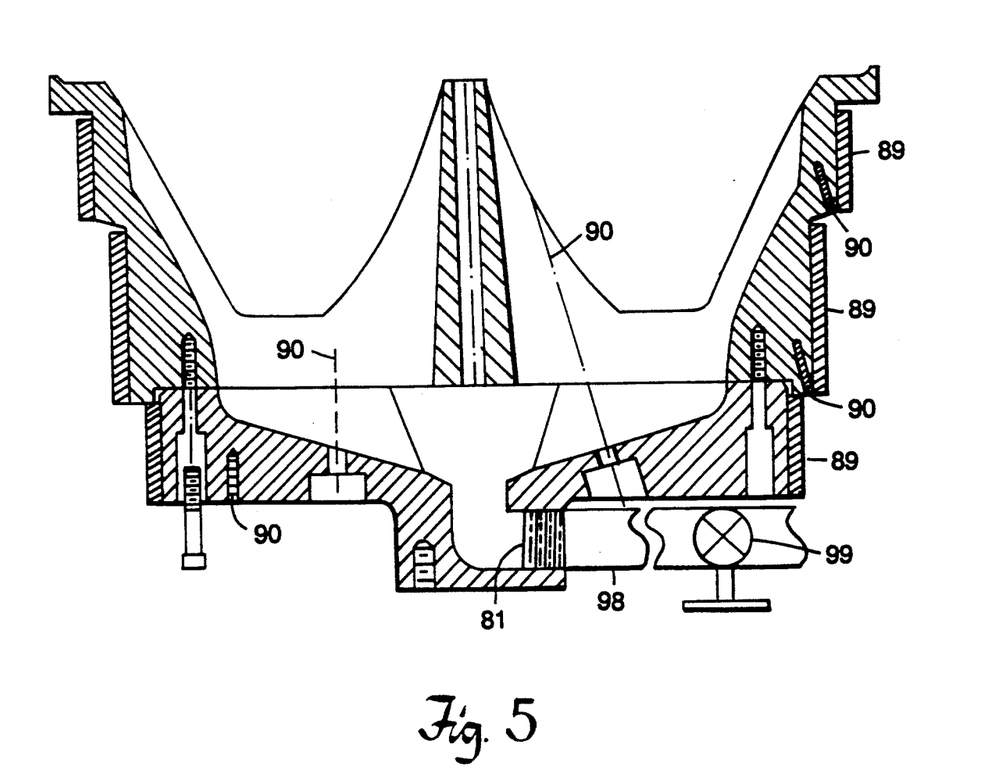
FIG. 5 is a cutaway side view of an exemplary embodiment of the cooking vessel used in the invention.

The cooking baskets are driven from the center of cooking vessel 81, but the pivot for dumping the cooking baskets is near the outer rim of cooking vessel 81 so that the cooked potato product 83 is dumped over the outer rim 85 of cooking vessel 81 into delivery chute 15.

For a single order, the rehydration, compression, and extrusion processes occur in approximately 16 seconds, and the cooking process is completed in approximately 50 seconds. Therefore, a single order is dispensed in approximately 66 seconds. Because the rehydration, compression, and extrusion processes can occur simultaneously on different orders, and the cooking process can simultaneously cook multiple orders, the apparatus is capable of dispensing individual orders of cooked potato product at a rate of 16 seconds per order.

Cooking vessel 81 is formed of two cast aluminum pieces 86 and 87 that are connected together with bolts 88. Cooking vessel 81 is massive: it has walls that are a minimum of $\frac{1}{2}$ inch thick. The outer surfaces of cooking vessel 81 are machined to mate, accept the attachment of heater bands 89 (not shown), accommodate the cooking basket drive 41, and accommodate several temperature sensors 90. The interior of cooking vessel 81 is teflon coated.

Three heater bands 89 are clamped to steps 91, 92, and 93 located on the exterior of cooking vessel 81. These heater bands can provide a total of 8.25 kW of heater power and are independently controlled. The cooking oil is heated indirectly from walls 94 and vanes 95 of the cooking vessel 81. The large thermal mass of the aluminum walls ensures that the entire structure and the cooking oil contained therein are evenly heated.

The temperature of the cooking oil is carefully controlled. Proper management of the cooking oil's temperature extends the life of the cooking oil and produces cooked potato product of high quality. To accomplish this control, high accuracy thermistors 90 (not shown) are located under each heater band and constantly monitor the temperature of the cooking vessel under each of the three heater bands. Each of these thermistors 90 maintains the cooking vessel's temperature at 393° F. +/− 2° F. by turning on its respective heater band when the thermistor 90 determines that the temperature of the cooking vessel under that heater band is less than 393° F. and turning off that heater band when the thermistor 90 determines that the temperature of the cooking vessel under that heater band is in excess of 393° F. An additional thermistor 91 (not shown) is submersed in the cooking oil and also controls the heater bands so that the cooking oil is maintained at 373° F. +/− 2° F. If the temperature of the cooking oil exceeds 373° F., thermistor 91 turns off all of the heater bands. Therefore, the cooking vessel's surface temperature is maintained at approximately 393° F. until, and unless, the cooking oil is at 373° F.

High pressure blower 21 draws air through an inlet 92 located at the bottom of the apparatus 10. Air then flows across power supply 93 and the control system 23 to provide cooling to these devices. Air then flows through cooking vessel enclosure 14 to pick up heat and vapors generated in the cooking process. Next, the air flows through an oil coalescing filter 19 and an odor filter 20 to remove these vapors before the air flows through blower 21 and out exhaust vents 22.

This arrangement causes a large percentage of the air to flow across the cooking oil, and thereby removes the heat and vapors generated during cooking. The arrangement also ensures that essentially all vapors are removed so that only odor free air is exhausted from the exhaust vents 22.

Oil filter system 16 is only used when the apparatus 10 is not in operation. When the oil filter system 16 is activated, the cooking oil is drained through a drain hole 97 located in the bottom of cooking vessel 81. This oil drains through a drain tube 98 and, via a first valve 99 into a first filtering chamber 100 (not shown). When all of the cooking oil has drained through valve 99, valve 99 closes. From the first filtering chamber 100, the cooking oil flows through a filter 101 and into a second filtering chamber 102. From filtering chamber 102, an oil filtering pump 103 pumps the filtered cooking oil, via a second valve 104, the drain tube 98, and the drain hole 97, back into the cooking vessel 81.

Built-in test equipment is also provided. The built-in test equipment includes an air filter status LED, a deionizer status LED, six power supply status LEDs and four heater status LEDS. The designated function is operating correctly when an LED is green. A DB-9 connector is also included as part of the built-in test equipment for the purpose of reading notes and performing extended diagnostics with the aid of a portable computer.

The control system 33 is implemented using a special purpose computer (SPC) and its program. The SPC provides all of the functions necessary to control, initialize, maintain, monitor, service, and test the processes. The SPC is interfaced to various electronic circuitry that converts the signals so that the SPC can drive and monitor the various processes. All motion actions are initiated by the SPC and terminated by their specific control circuits. However, the SPC monitors all actions to verify that they have terminated correctly. The SPC monitors all status indicators and non-SPC initiated and/or controlled functions to ascertain that they are normal. If the SPC finds a function to be other than normal it either attempts to correct the problem, continues operations in an impaired mode, suspends operations, or terminates operations.

The safety system comprises circuit breakers, fuses, over-temperature sensors, and an automatic fire extinguisher. The safety system helps prevent serious damage that may be caused by parts failure or by fire. The fire extinguisher puts out a fire. The safety system also includes the safety loop and the door actuated interlock switch. The safety loop provides power to the contactor coil via the air volume, the fire extinguisher pressure and the oil over temperature switches. These three switches are wired in series and are normally closed if the invention is operating properly so that the contactor is held in its activated position (closed). If any of these switches open, the contactor coil becomes de-energized which causes the apparatus to shut down. The door interlock switch is activated either when the main door is closed or when the switch is deliberately moved to the service position. When the door interlock switch is not activated, power is removed from all motors except the motor that powers high pressure blower 21. This interlock feature helps ensure that service personnel are not accidentally injured by unintended, or deliberate, operation of the various drive mechanisms.

The dehydrated food product is preferably a novel, all-natural, dehydrated potato product that comprises a mixture of dehydrated potato granules, both large and small cell pregelatinized potato starch, xantham gum, guar gum, natural flavor, and cellulose. This dehydrated potato product is combined with water in a predetermined ratio to produce a rehydrated potato mixture of consistent characteristics. Generally, a preferred quantity of this rehydrated potato mixture comprises, by weight, 23% to 28% of the dehydrated potato product and 72% to 77% water.

Other embodiments are within the claims.

What is claimed is:

1. Apparatus for preparing, cooking, and dispensing a food product, comprising:
   a rehydration chamber for combining a quantity of dehydrated food product and a quantity of heated rehydration liquid to produce a quantity of rehydrated food product, said quantity of rehydrated food product being sufficient to produce an individual portion of cooked food product,
   a compression station for compressing said rehydrated food product to create a prepared mixture of homogenous consistency,
   an extrusion station for extruding said prepared mixture into a cooking medium,
   a cooker containing said cooking medium for cooking the extruded prepared mixture and producing an individual portion of cooked food product, and
   a dispenser for dispensing said individual portion of cooked food product,
   wherein said rehydration chamber, said compression station, said extrusion station, and said cooker are arranged so that said rehydration chamber can process a first individual portion of cooked food product while said compression station is simultaneously processing at least a second individual portion of cooked food product,
   said extrusion station is simultaneously processing at least a third individual portion of cooked food product, and
   said cooker is simultaneously processing at least a fourth individual portion of cooked food product.

2. The apparatus of claim 1 wherein said apparatus further includes a supply unit for storing a quantity of said dehydrated food product and supplying said dehydrated food product to said rehydration chamber.

3. The apparatus of claim 2 wherein said supply means has a maximum storage capacity in excess of the quantity of said dehydrated food product needed to produce 100 of said individual portions of cooked food product.

4. The apparatus of claim 3 wherein said supply unit has a maximum storage capacity in excess of the quantity of said dehydrated food product needed to produce 400 of said individual portions of cooked food product.

5. The apparatus of claim 2 wherein said supply unit includes a sensor for detecting when the quantity of dehydrated food product contained in said supply unit is an insufficient quantity to produce a said individual portion of cooked food product.

6. The apparatus of claim 5 wherein said sensor comprises a light source and a light detector arranged so that light from said light source is only detectable by said light detector when said supply unit contains said insufficient quantity of said dehydrated food product.

7. The apparatus of claim 2 wherein said supply unit includes a sensor for detecting when the quantity of dehydrated food product contained in said supply unit is less than a predetermined percentage of the maximum storage capacity of said supply unit.

8. The apparatus of claim 7 wherein said sensor comprises a light source and a light detector arranged so that light from said light source is only detectable by said light detector when said quantity of dehydrated food product in said supply unit is less than said predetermined percentage.

9. The apparatus of claim 1 wherein said rehydration chamber includes a quantity meter, said quantity meter ensuring that said quantity of dehydrated food product is consistently a predetermined quantity.

10. The apparatus of claim 9 wherein said quantity meter includes a paddle wheel having multiple chambers.

11. The apparatus of claim 9 wherein said quantity meter includes an auger.

12. The apparatus of claim 1 wherein said rehydration chamber includes a rehydrator, said rehydrator comprising a manifold including:
    a central hole through which falls a stream of said dehydrated food product,
    a rehydration fluid inlet, and
    a plurality of spray nozzles for directing a spray of rehydration fluid at said stream of dehydrated food product.

13. The apparatus of claim 12 wherein said spray of rehydration fluid is directed in an interferometer pattern at the center of said stream of dehydrated food product.

14. The apparatus of claim 12 wherein said spray nozzles start said spray of rehydration fluid before occurrence of said stream of dehydrated food product.

15. The apparatus of claim 12 wherein said spray nozzles end said spray of rehydration fluid after termination of said stream of dehydrated food product.

16. The apparatus of claim 12 wherein said rehydration chamber further includes a director for directing said dehydrated food product to said central hole of said rehydrator and producing said stream of dehydrated food product.

17. The apparatus of claim 1 wherein said apparatus further includes a rehydration liquid supply unit for supplying said quantity of rehydration liquid to said rehydration chamber.

18. The apparatus of claim 17 wherein said rehydration liquid supply unit includes a sediment filter for removing sediment in said rehydration liquid.

19. The apparatus of claim 17 wherein said rehydration liquid supply unit includes a deionizing filter for deionizing said rehydration liquid and removing dissolved chemicals and minerals from said rehydration liquid.

20. The apparatus of claim 17 wherein said rehydration liquid supply unit includes a reservoir for storing said rehydration liquid.

21. The apparatus of claim 17 wherein said rehydration liquid supply unit includes a heater for heating said rehydration liquid.

22. The apparatus of claim 17 wherein said rehydration liquid supply unit includes a pump, said pump ensuring that said quantity of rehydration liquid is consistently a predetermined quantity.

23. The apparatus of claim 1 wherein said apparatus further includes a transport for transporting said food product from said rehydration chamber to said compression chamber.

24. The apparatus of claim 23 wherein said transport is a carousel.

25. The apparatus of claim 1 wherein said apparatus further includes a transport for transporting said food product from said compression station to said extrusion station.

26. The apparatus of claim 25 wherein said transport is a carousel.

27. The apparatus of claim 1 wherein said extrusion station includes:
an extrusion grate, said extrusion grate located at said extrusion station, and
an extrusion ram, said extrusion ram located above said extrusion grate,
wherein said extrusion ram extrudes said prepared mixture by moving downward and forcing said prepared mixture through said extrusion grate.

28. The apparatus of claim 27 wherein said extrusion station is located over said cooker and said extrusion ram moves downward until said extrusion ram contacts said extrusion grate to separate said prepared mixture from said extrusion grate and allow said extruded prepared mixture to fall by gravity into said cooker.

29. The apparatus of claim 28 wherein said extruded prepared mixture is partially submersed in said cooking medium when said extruded prepared mixture falls by gravity into said cooker.

30. The apparatus of claim 1 wherein said cooker includes a plurality of cooking baskets, each of said cooking baskets being of sufficient size to hold a said individual portion of cooked food product.

31. The apparatus of claim 30 wherein said cooker further includes a centrally-located rotating shaft, each of said cooking baskets being attached, via a coupling mechanism, to said shaft.

32. The apparatus of claim 1 wherein said cooker includes:
a cooking vessel,
a plurality of heater bands, and
a plurality of cooking vessel temperature sensors,
wherein each one of said cooking vessel temperature sensors is associated with one of said heater bands, said cooking vessel temperature sensors being arranged so that, when the temperature sensed by said one cooking vessel temperature sensor is less than a first predetermined temperature, said one cooking vessel temperature sensor turns on said one heater band and, when the temperature sensed by said one cooking vessel temperature sensor exceeds said first predetermined temperature, said one vessel temperature sensor turns off said one heater band.

33. The apparatus of claim 32 wherein said cooker further includes a cooking medium temperature sensor located in said cooking medium, said cooking medium temperature sensor being arranged so that, when the temperature sensed by said cooking medium temperature sensor exceeds a second predetermined temperature, said second predetermined temperature being less than said first predetermined temperature, said cooking medium temperature sensor turns off said plurality of heater bands.

34. The apparatus of claim 1 wherein said apparatus further include an air distributor, said air distributor including:
an inlet,
a high pressure blower,
an oil coalescing filter,
an odor filter, and
an exhaust vent,
wherein said air distributor is arranged so that air flows into said apparatus through said inlet, around said cooker, through said oil coalescing filter, through said odor filter, through said high pressure blower, and out said exhaust vent.

35. The apparatus of claim 34 wherein said apparatus further includes a power supply and electronics, said air distributor arranged so that air flows across said power supply and said electronics before flowing around said cooker.

36. The apparatus of claim 1 wherein said apparatus further includes a cooking medium filtering system for filtering said cooking medium, said cooking medium filtering system comprising:
a drain hole located at the bottom of said cooker,
a drain tube having a first end and a second end, said first end of said drain tube being connected to said drain hole,
a first filtering chamber,
a second filtering chamber,
a filter disposed between said first and second filtering chambers,
a pump,
a first valve disposed between said second end of said drain tube and said first filtering chamber, and
a second valve disposed between said second end of said drain tube and said second filtering chamber,
all constructed and arranged to filter said cooking medium by:
opening said first valve,
draining said cooking medium from said cooker into said first filtering chamber through via said drain hole, said drain tube, and said first valve,
closing said first valve,
passing said cooking medium from said first filtering chamber, through said filter, and into said second filtering chamber,
opening said second valve,
activating said pump and pumping said cooking medium into said cooker from said second filtering chamber via said second valve, said drain tube, and said drain hole.

37. The apparatus of claim 1 wherein said dehydrated food product comprises:
dehydrated potato granules,
large cell pregelatinized potato starch,
small cell pregelatinized potato starch,
xantham gum,
guar gum, and
yeast extract for flavoring.

38. The apparatus of claim 37 wherein said dehydrated food product comprises cellulose.

* * * * *